(12) United States Patent
Engesser et al.

(10) Patent No.: US 7,028,448 B2
(45) Date of Patent: Apr. 18, 2006

(54) DISPENSING APPARATUS AND METHOD OF DISPENSING

(75) Inventors: Michael D. Engesser, St. Paul, MN (US); Andrew A. Peterson, Minneapolis, MN (US); Steve D. White, Maple Grove, MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 11/116,850

(22) Filed: Apr. 28, 2005

(65) Prior Publication Data

US 2005/0183393 A1    Aug. 25, 2005

Related U.S. Application Data

(62) Division of application No. 10/209,770, filed on Aug. 1, 2002, now Pat. No. 6,904,737.

(51) Int. Cl.
*B65B 9/20* (2006.01)

(52) U.S. Cl. ............................. 53/451; 53/474; 53/238; 53/551; 141/256

(58) Field of Classification Search ..................... None
See application file for complete search history.

(56) References Cited

U.S. PATENT DOCUMENTS 914,973 A * 3/1909 Pickett ..................... 222/140

2,160,367 A * 5/1939 Maxfield ..................... 53/433

(Continued)

FOREIGN PATENT DOCUMENTS

JP            07299345       * 11/1995

(Continued)

*Primary Examiner*—John Sipos
(74) *Attorney, Agent, or Firm*—Annette M. Frawley; Arlene L. Hornilla; John A. O'Toole

(57) ABSTRACT

A dispensing apparatus is provided suitable for dispensing at least first and second components in desired ratios especially for multi-component packaged food products. The apparatus comprises a hopper having an outlet at its lower end and a first auger having a hollow shaft disposed within the hopper having component conveying flights and a drive means for rotating the auger. A first component is conveyed by the auger flights and dispensed at an outlet while a second component is conveyed though a hollow shaft of the auger. The apparatus can include a second rotationally driven auger that is positioned within the hollow shaft of the first auger having conveying flights. The second component can be conveyed via the second auger within the hollow shaft. The second auger's shaft also can be hollow whereby a third component can be conveyed through the second hollow shaft of the second auger. Also provided are methods for dispensing measured quantities of multiple components for providing blends of components characterized by highly uniform amounts of each component in each quantity of the blend. The components dispensed can be blended and packaged in a single container such as a film pouch or separately in a multi-compartment pouch.

11 Claims, 10 Drawing Sheets

U.S. PATENT DOCUMENTS

| | | | |
|---|---|---|---|
| 2,874,878 A | * | 2/1959 | Stokland .................... 222/140 |
| 2,904,220 A | * | 9/1959 | Stokland .................... 222/140 |
| 3,808,881 A | * | 5/1974 | Dietert ........................ 73/794 |
| 3,861,121 A | * | 1/1975 | Monsees ...................... 53/239 |
| 3,892,060 A | * | 7/1975 | Stanley, Jr. ................. 53/552 |
| 4,241,563 A | * | 12/1980 | Muller et al. ................ 53/552 |
| 4,407,108 A | * | 10/1983 | Craig .......................... 53/451 |
| 4,426,018 A | * | 1/1984 | Ward .......................... 222/413 |
| 5,067,310 A | * | 11/1991 | Yamanaka .................. 53/551 |
| 5,199,245 A | * | 4/1993 | Daddario et al. ............ 53/451 |
| 5,581,984 A | * | 12/1996 | Domke et al. ................ 53/552 |
| 5,832,700 A | * | 11/1998 | Kammler et al. ............ 53/502 |
| 5,893,260 A | * | 4/1999 | McKenna .................... 53/451 |
| 6,314,706 B1 | * | 11/2001 | Araki et al. .................. 53/451 |
| 6,497,259 B1 | * | 12/2002 | Wegman ..................... 141/267 |

FOREIGN PATENT DOCUMENTS

| | | | |
|---|---|---|---|
| JP | | 10-297769 | * 11/1998 |
| SU | | 579516 | * 11/1977 |

\* cited by examiner

DISPENSING APPARATUS AND METHOD OF DISPENSING

REFERENCE TO RELATED APPLICATIONS

This application is a divisional of U.S. patent application Ser. No. 10/209,770 filed on Aug. 1, 2002 now U.S. Pat. No. 6,904,737.

BACKGROUND OF THE INVENTION

The present invention relates to a dispensing apparatus and method of dispensing different materials in desired ratios. More particularly, although not exclusively, the present invention relates to a method and apparatus utilising an auger to dispense a first material while dispensing one or more further material via a hollow shaft of the auger. The invention finds particular application in the dispensing of consumable food products to be packaged.

A number of consumable food products are provided in packages in desired ratios, such as baking mixes (e.g. cookies, brownies, cakes, muffins, pancakes, etc), savoury food products (e.g. cheese and macaroni seasoned mashed potato) etc. Different components have different physical properties and some are fragile. One conventional approach has been to premix components in bulk in desired ratios and then dispense the mixed components to be packaged. This approach has the disadvantage that materials having different physical properties tend to segregate. This results in packages of the food products containing an inconsistent mixture of components. To ensure that a minimum amount of certain components are present additional amounts must be added at the bulk mixing stage. This can increase the cost of production and still results in varying ratios of components in the packages.

As well as delivering the components in inconsistent ratios the prior art techniques can also damage fragile particulate components (such as chocolate chips, nuts, coloured chips, fruit etc). In a typical prior art dispenser the premixed components are fed from a bulk-mixing hopper to a dispensing hopper. An auger is driven to deliver desired amounts of the premixed material to an outlet of the dispensing hopper for bagging. Fragile particulate components can be damaged by such dispensing due to shear effects at the edge of the auger. Further, such an arrangement requires a bulk-mixing hopper to premix the components. Additionally, in the prior art dispenser it is difficult to change from the dispensing of one product mixture to another, as the contents of the main hopper must be fully discharged. In the prior art where one of the components is a potential allergen (such as peanuts) a full clean out of the complete apparatus can be required prior to dispensing an allergen free product.

SU 579516 discloses an apparatus for feeding and drying free flowing moist materials. An auger within a pipe feeds materials into a zone where the material is exposed to "heat carrier jets" and the fluidised material is conveyed to an outlet nozzle. The invention relates to an apparatus and method for pre-drying a uniform material and does not disclose a method or apparatus for mixing different materials in desired ratios.

JP 10297769 relates to a bag-filling device for filling a bag with a powdered material. An auger moves the powder from a hopper to an outlet while a rod is movable within the shaft supporting the auger to perform deaeration. Again, there is not disclosed a method or apparatus for mixing different components in desired ratios.

BRIEF SUMMARY OF THE INVENTION

It is an object of the invention to provide a dispensing apparatus and method that provides components in substantially uniform ratios throughout a dispensing cycle.

It is a further object of the invention to provide a dispensing apparatus and method that reduces the damage to components being dispensed.

It is a further object of the invention to provide a dispensing apparatus that facilitates quick and easy transitions when changing the composition of the components being dispensed.

These objects are each to be read disjunctively with the object of at least providing the public with a useful choice.

According to a first aspect of the invention there is provided a dispensing apparatus comprising: a hopper having an outlet at one end thereof; a first auger comprising a first hollow shaft having auger flights along at least part of the shaft positioned within the hopper so as to feed, in use, a first component within the hopper to the outlet when rotated; a first drive for rotating the first hollow shaft; and a dispenser for supplying a second component through the hollow shaft to the outlet.

Components can be dispensed via the first hollow shaft or via a liner there within. A second or further subsequent auger can be provided within the first hollow shaft for dispensing one or more further components. The desired amount of the second component dispensed in each cycle can be controlled using a cup filler, combination scales or the like. Alternatively, a second auger can be driven continuously with the first auger or for predetermined periods to dispense a desired quantity of the second component. Alternatively, a packaged quantity of the second material can be provided via the first hollow shaft. Alternatively, a fluid can be provided via the first hollow shaft and controlled via a valve.

The dispensing apparatus can include a gas supply or vacuum for supplying a gas to or removing air from the outlet via the first hollow shaft.

The dispensing apparatus can include a bagging device that forms a closed package containing the components supplied at the outlet in each cycle. Alternatively, the bagging device can form a first pouch for receiving the first component and a second pouch for receiving the second component.

According to a further aspect of the invention there is provided a method of dispensing a first component and a second component comprising the steps of: supplying the first component to a hopper having an outlet at one end and a first auger comprising a first hollow shaft having auger flights extending from the outlet end to the interior of the hopper; rotating the first hollow shaft to feed the first component from the hopper to the outlet at a first desired rate; and supplying the second component via the first hollow shaft to the outlet at a second desired rate.

The components may be edible or non-edible components. The first component may be a particulate component. The second component may be a particulate component, liquid or pre-packaged component.

The first shaft can be rotated substantially continuously or in a pulsed manner. The second component can be supplied in discrete quantities delivered by a cup-filler or combination scales or the like. Alternatively, a second auger can be provided within the first hollow shaft to deliver the second component at a desired rate (for an embodiment in which substantially continuous flows of the first and second component are delivered to the outlet) or in a pulsed manner.

Alternatively, a flow control aperture can be provided within the first hollow shaft to control the flow of the second component. Where a liquid is supplied a valve can control the supply of fluid via the first hollow shaft. The first and second components can be particulate materials. Alternatively, the first component can be a particulate material and the second component a liquid. A gas, preferably an inert gas, can be supplied via the first hollow shaft or air removed via the first hollow shaft.

The components provided at the outlet can be packaged within pouches formed at the outlet. In one embodiment the second component can be packaged within an inner pouch formed within an outer pouch containing the first component and inner pouch.

BRIEF DESCRIPTION OF THE DRAWINGS

The invention will now be described by way of example with reference to the accompanying drawings in which.

DETAILED DESCRIPTION OF THE INVENTION

Figure 1:
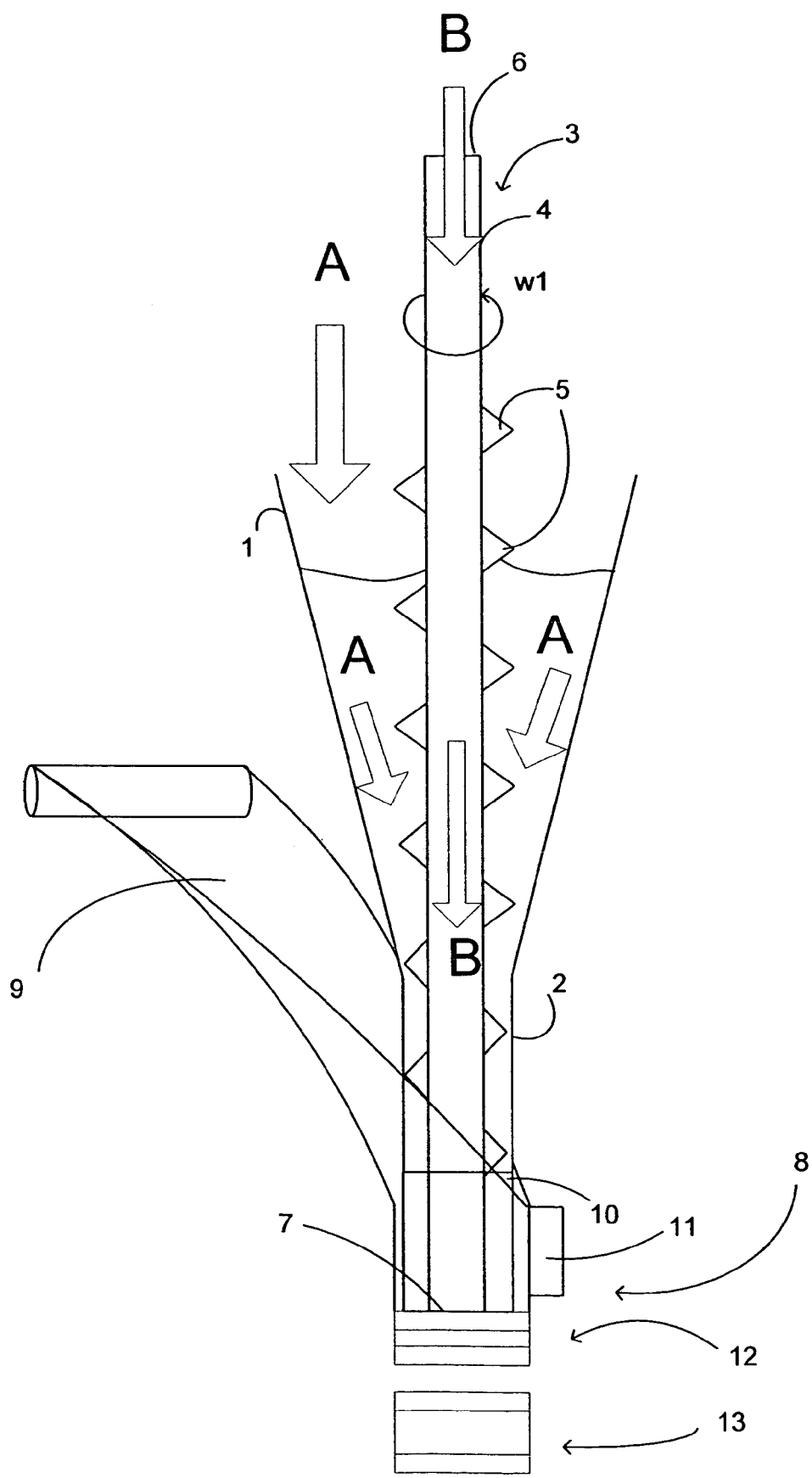
FIG. 1 shows a schematic diagram of a dispensing apparatus according to a first embodiment.

Referring firstly to FIG. 1 a schematic view of a dispensing apparatus according to a first embodiment is shown. A first component A is supplied to a hopper 1. The first component A is dispensed at an outlet 2 when an auger 3 is rotated. The auger 3 comprises a hollow tubular shaft 4 having auger flights 5 formed along part of its length. The auger flights 5 can be a single helical blade or multipart flights. Upon rotation of the shaft 4 in the direction indicated by arrow w1 (or in the opposite direction for a helical blade that spirals in the opposite direction) the first component A is dispensed at the outlet 2. The hollow shaft 4 can be generally vertical, as shown, or inclined at about 45° to vertical or otherwise.

The shaft 4 can be driven by any suitable drive such as an electric, pneumatic or hydraulic motor, with suitable gearing as appropriate. The shaft 4 can be driven continuously or in a pulsed or intermittent, or variable speed manner to deliver the component A to the outlet 2 at a desired rate. A second component B can be conveyed through the hollow shaft 4 from an inlet end 6 thereof to an outlet end 7 to combine with the first component A at the outlet 2. By controlling the rate of delivery of the first component A and the second component B a desired mixing ratio of the first and second components A and B can be achieved.

The components supplied at outlet 2 can be packaged by a packaging device 8 of the type described in the Applicant's U.S. Pat. No. 5,171,950, Brauner et al. entitled "Flexible pouch and paper bag combination for use in the microwave popping of popcorn" (the disclosure of which is hereby incorporated by reference). A sheet or portion of packaging film 9 from a flexible film material roll can be formed around a forming collar 10 to be continuously sealed along its edge by a sealer 11. A sealer and cutter arrangement 12 can form sealed pouches 13 containing the first and second components. Although this form of packaging device is shown by way of example it will be appreciated that other packaging devices can be employed with the dispensing apparatus of the invention. It will be appreciated that other packaging devices can be used in conjunction with any dispensing apparatus hereinafter described.

Figure 2:
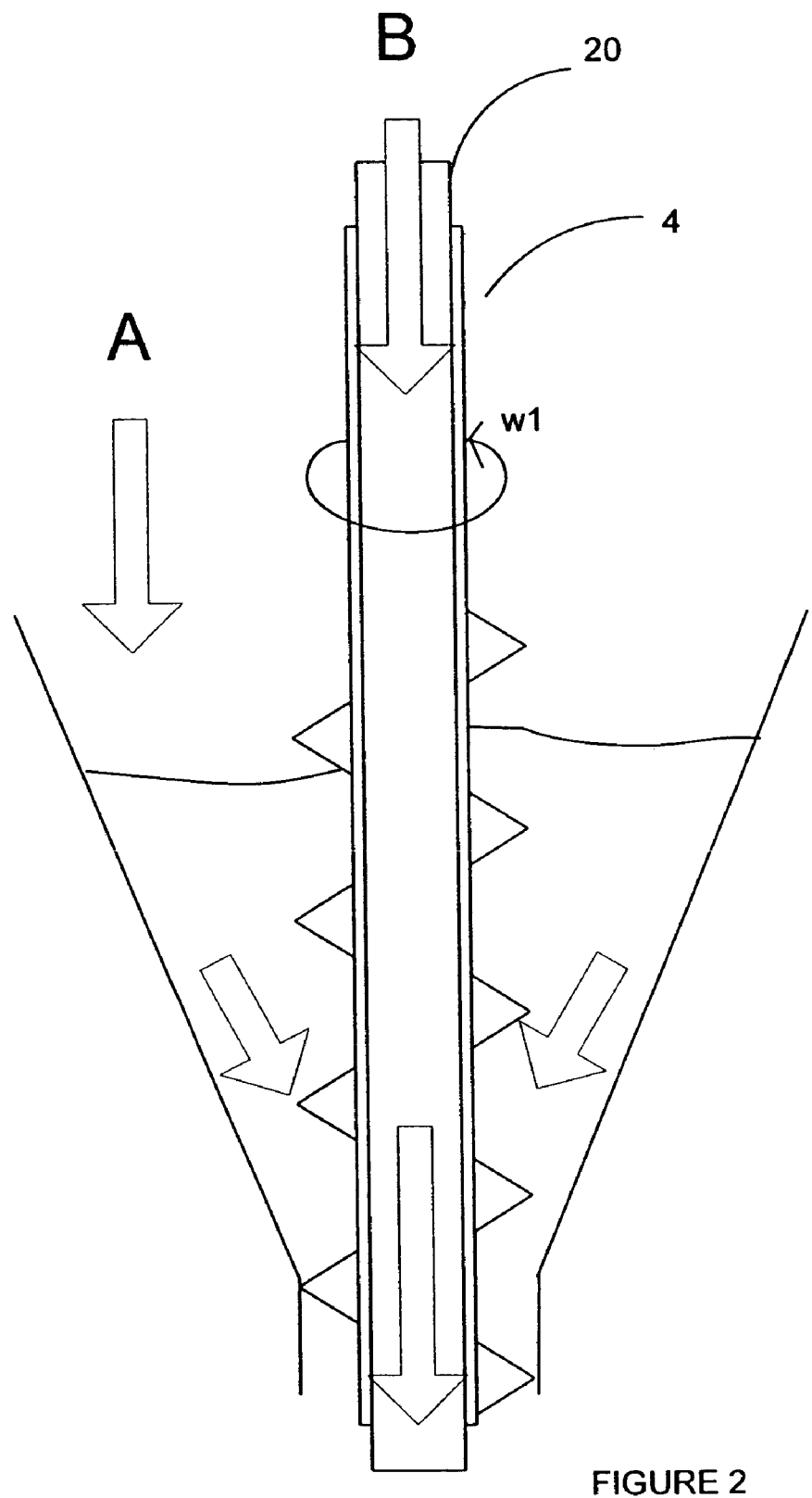
FIG. 2 shows a schematic diagram of the dispensing apparatus of FIG. 1 including a liner within the hollow shaft.

In the following drawings like components are given like reference numerals. FIG. 2 shows a schematic diagram of a dispenser of the form shown in FIG. 1 in which a liner 20 has been provided within a hollow shaft 4. The liner 20 can remain stationary as the hollow shaft 4 rotates thereabout. In this manner the second component B can flow through the stationary liner 20 contained within the hollow shaft 4 and flow without being affected by centrifugal forces. The centrifugal forces are typically a result of contact between the second component B and the interior wall of the hollow shaft 4. Such a liner 20 can be included within the hollow shaft 4 of any of the single auger embodiments or within the innermost hollow shaft of a multiple auger embodiment or between any of the shafts. The liner can be a rigid plastic or metal tube or a flexible tube formed of a flexible film or the like.

Figure 3:
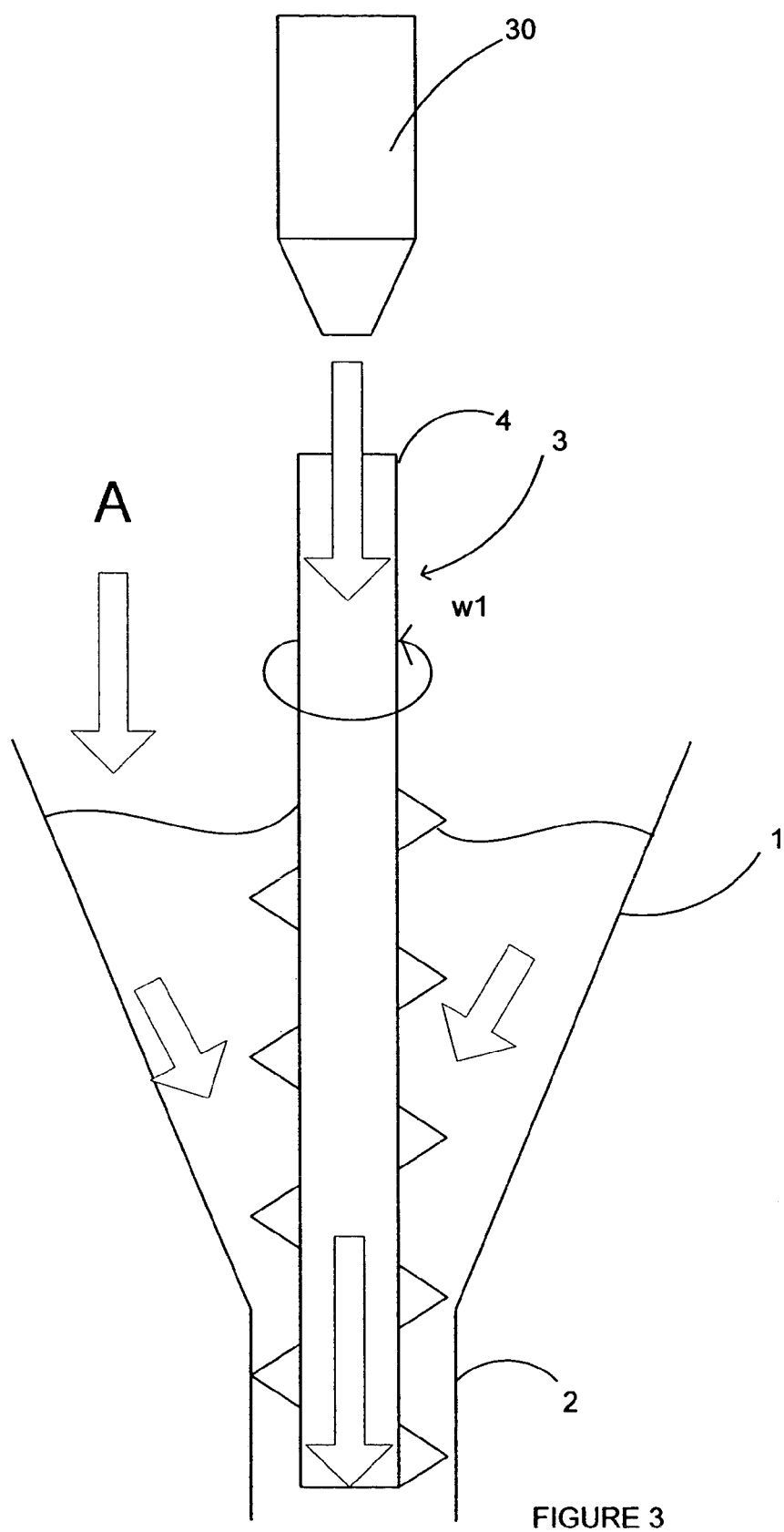
FIG. 3 shows the dispensing apparatus of FIG. 1 including a measuring device for supplying a second component.

Referring now to FIG. 3 a dispensing apparatus of the type shown in FIG. 1 is shown in combination with a dispensing means 30. The dispensing means 30 can supply a predetermined quantity of the second component B at timed intervals, e.g., periodic. Alternatively, the dispensing means 30 can supply a predetermined quantity of the second component B continuously. In a first embodiment the auger 3 can be driven at a substantially constant rotational speed w1 and predetermined quantities of the second component B can be supplied to the outlet 2 via the hollow shaft 4. Alternatively, auger 3 can be driven in a pulsed manner and the dispensing means 30 can deliver a measured quantity of the second component B once (or a predetermined number of times) every pulse. By either of these methods a predetermined ratio of the first component A to the second component B can be provided at the outlet 2 for packaging at periodic intervals.

Figure 7:
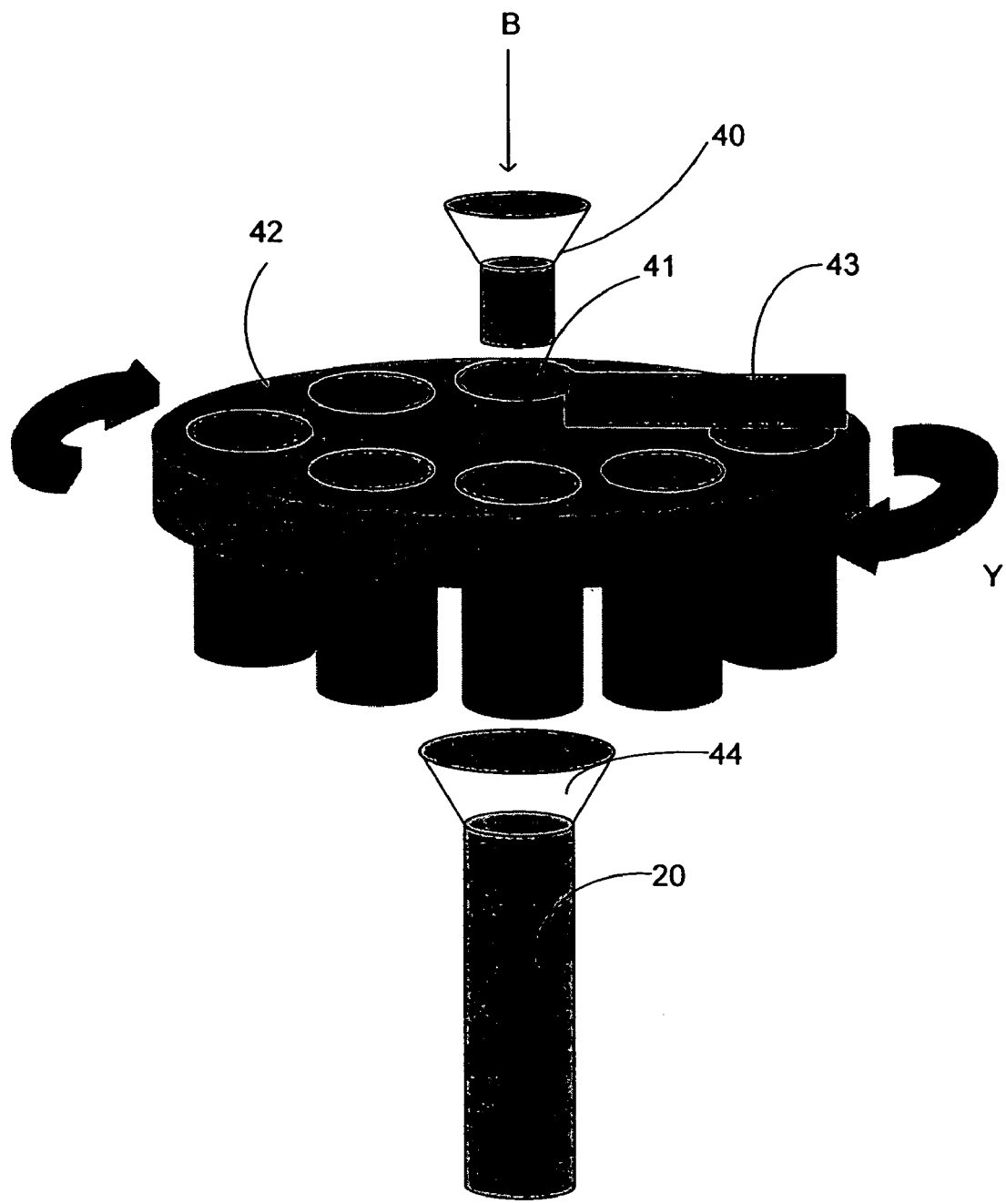
FIG. 7 shows a schematic drawing of a cup filler.

The dispensing means 30 can be any suitable measuring device such as a cup filler, combination scales etc. A suitable cup filler is shown diagrammatically in FIG. 7. The second component B is supplied to a funnel 40 that directs the second component B into a cup 41 supported by a tray 42. When an approximate amount of the second component B has been delivered to the cup 41 it is rotated in the direction indicated by arrow Y. As it rotates a scraper 43 levels the surface of the contents of the cup. The cup then rotates to a position over a funnel 44 and its bottom is opened to deliver a predetermined amount of the second component B to, in this case, the liner 20. It will be appreciated that a variety of measuring devices can be used in conjunction with the invention.

The dispensing means 30 can alternatively deliver packages containing desired quantities of the second component at periodic intervals. Preferably one package is supplied per pulse of the first auger or, for continuous first auger rotation, at intervals such as to result in one such package being combined with the first component for each packaging operation.

Figure 4:
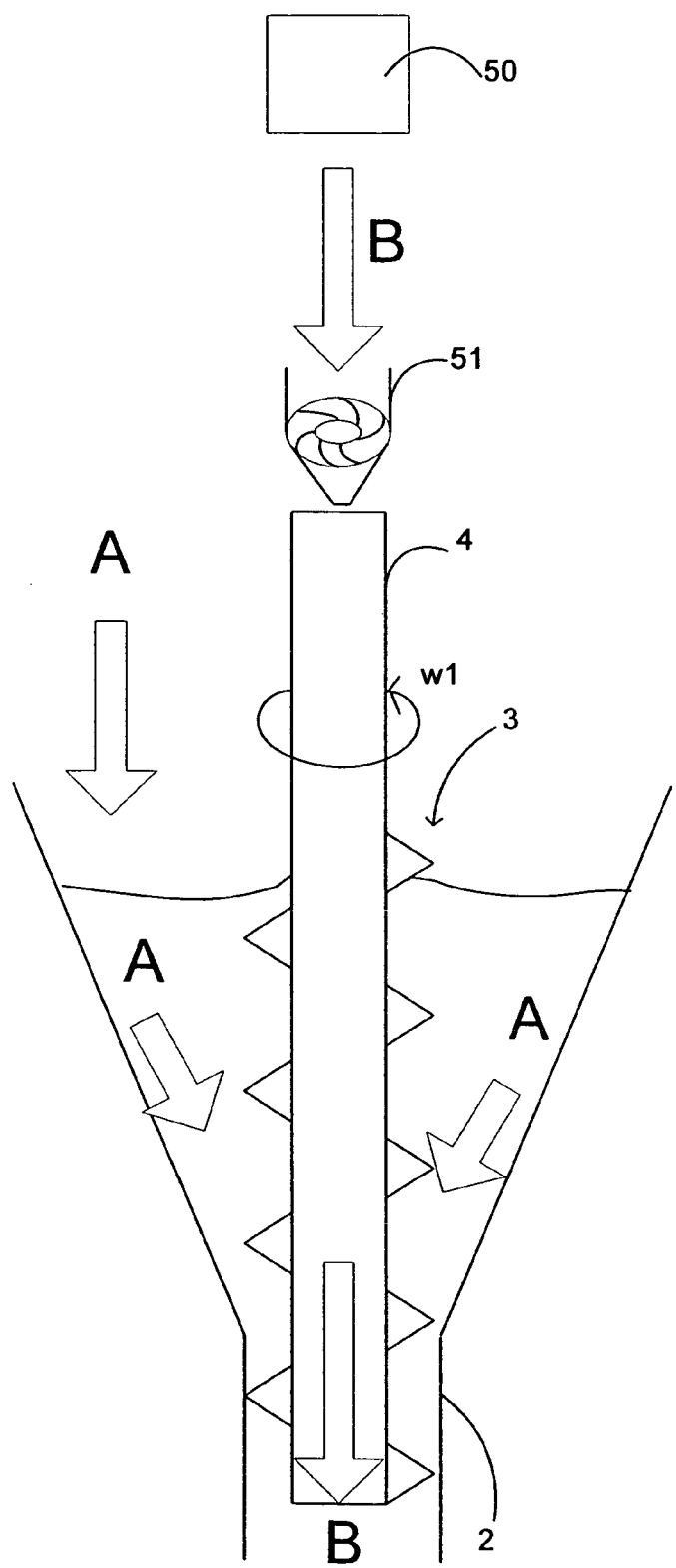
FIG. 4 shows a schematic drawing of the dispensing apparatus of FIG. 1 including a flow control aperture.

Referring now to FIG. 4 an alternative embodiment is shown in which the second component B is supplied from a storage hopper 50 to a flow rate control device 51 that supplies the second component B to a hollow shaft 4 at a desired rate. In this case the flow control device 51 is an iris or other suitable particulates flow control mechanism that can be opened or closed to form an aperture of a desired size to supply the second component B to an outlet 2 at a desired rate. In this embodiment auger 3 can be driven substantially continuously and the second component B can be supplied at a substantially constant rate so that the ratio of the first and second components A and B remains substantially constant. By packaging the material emanating from outlet 2 at predetermined intervals substantially constant quantities of the first and second components A and B can be packaged in each package.

Figure 5:
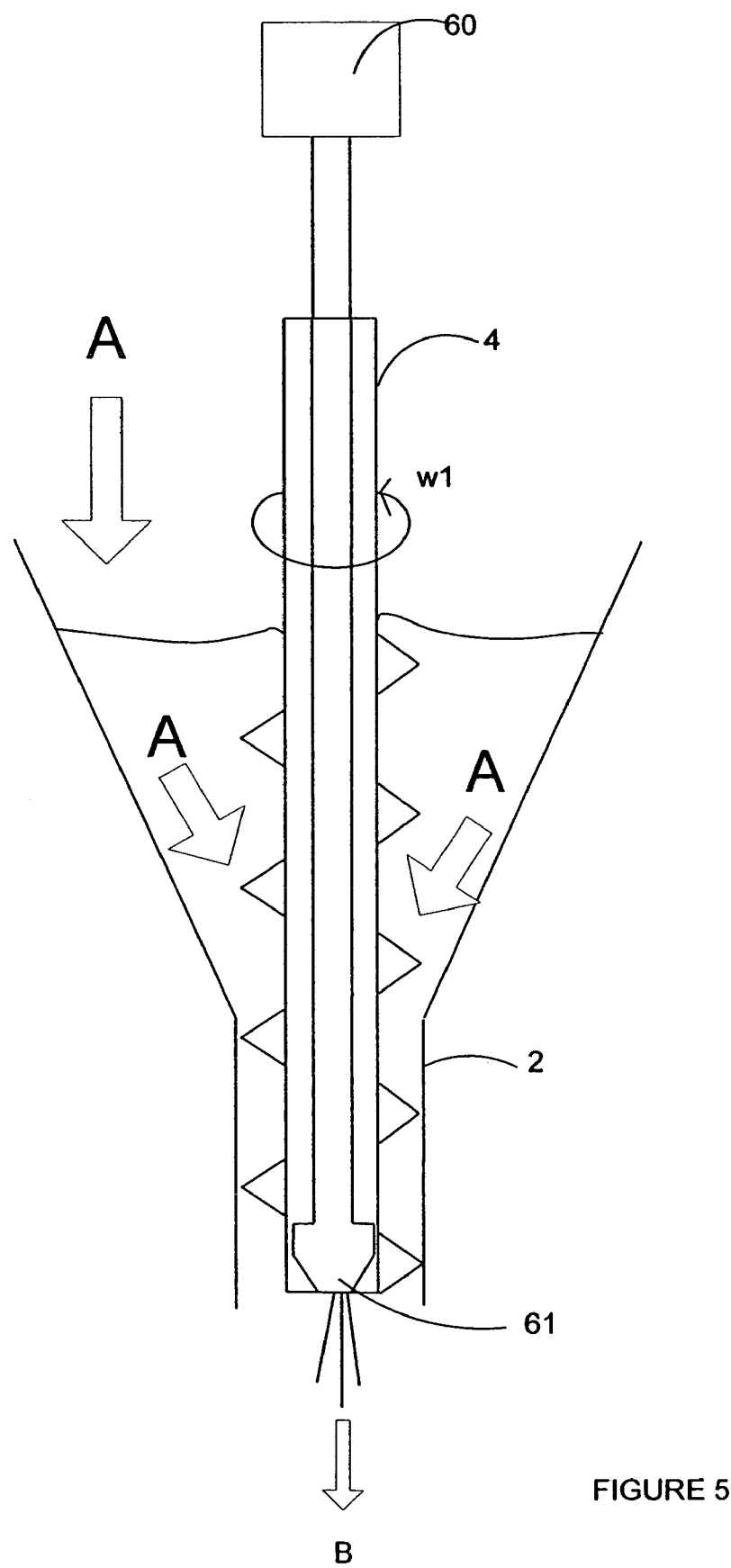
FIG. 5 shows a schematic drawing of the dispensing apparatus of FIG. 1 including a fluid dispensing nozzle.

Referring now to FIG. 5 a further embodiment is shown in which the second component B is in the form of a fluid that is supplied from a reservoir 60 to the interior of the hollow shaft 4 via a nozzle 61. In this case it can be desirable to include a liner of the type shown in FIG. 2 to avoid interaction between the fluid second component B and the interior wall of the hollow shaft 4. To avoid deleterious interaction between the first component A and the fluid second component B materials can be packaged within separate pouches. A first pouch can be continuously formed around an outlet extending from the hollow shaft 4 to package the second component B and a second pouch can be simultaneously formed around an outlet 2 surrounding the first pouch. Alternatively, the first component A can be supplied to a first pouch and sequentially the second component B can be supplied to a second sequential pouch.

Figure 8:
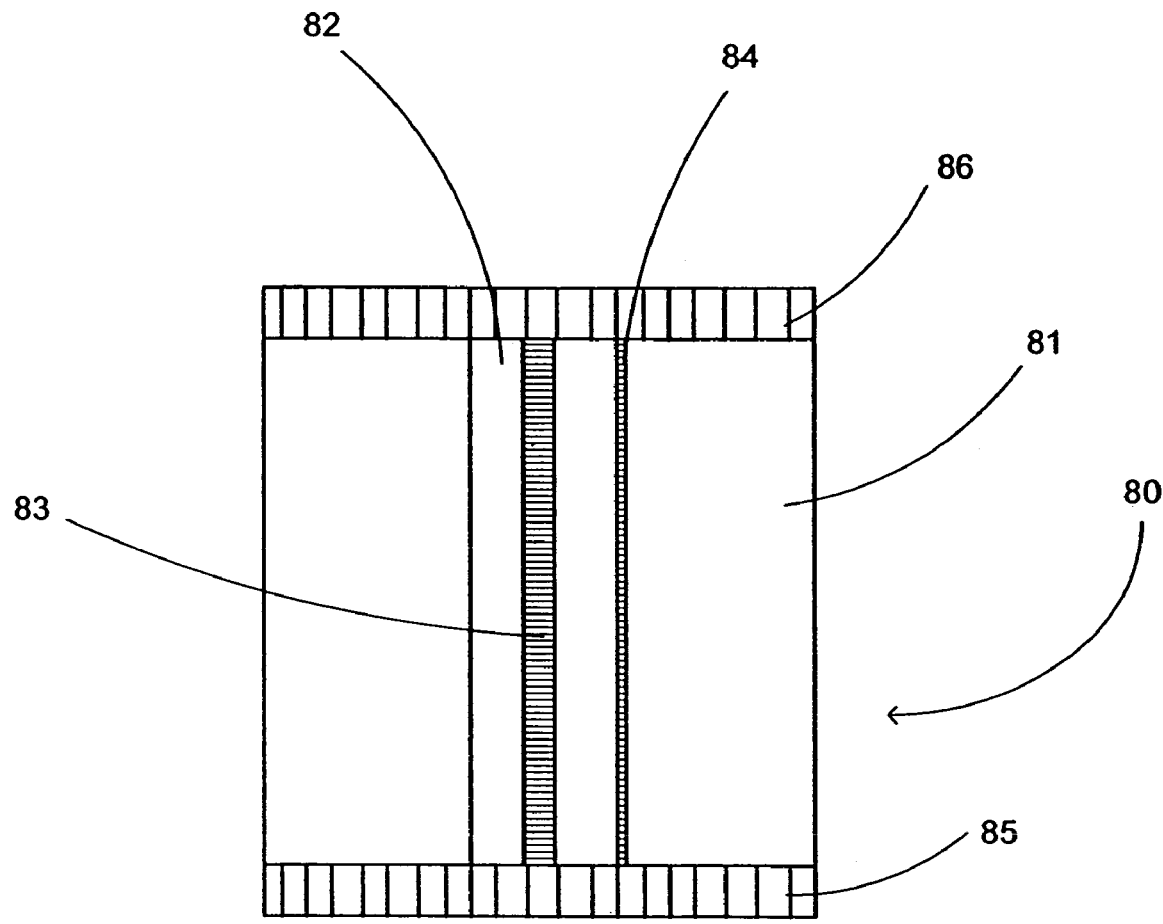
FIG. 8 shows a pouch in a pouch package, packaging materials in a separated manner.

FIG. 8 shows a pouch in a pouch package that can be formed by this process. A package 80 includes a first pouch 81 and an internal second pouch 82. The first pouch 81 has a longitudinal seal 83 that is continuously formed as a first plastic sheet formed around the outlet 2. The second pouch 82 has a continuous longitudinal seal 84 formed as a second plastic sheet is continuously formed around an outlet extending from the hollow shaft 4. Both the first and second pouches 81 and 82 are continuously sealed along their ends 85 and 86 to form the internal second pouch 82 containing the second material and a main pouch 81 containing the first component and the second pouch 82.

Figure 6:
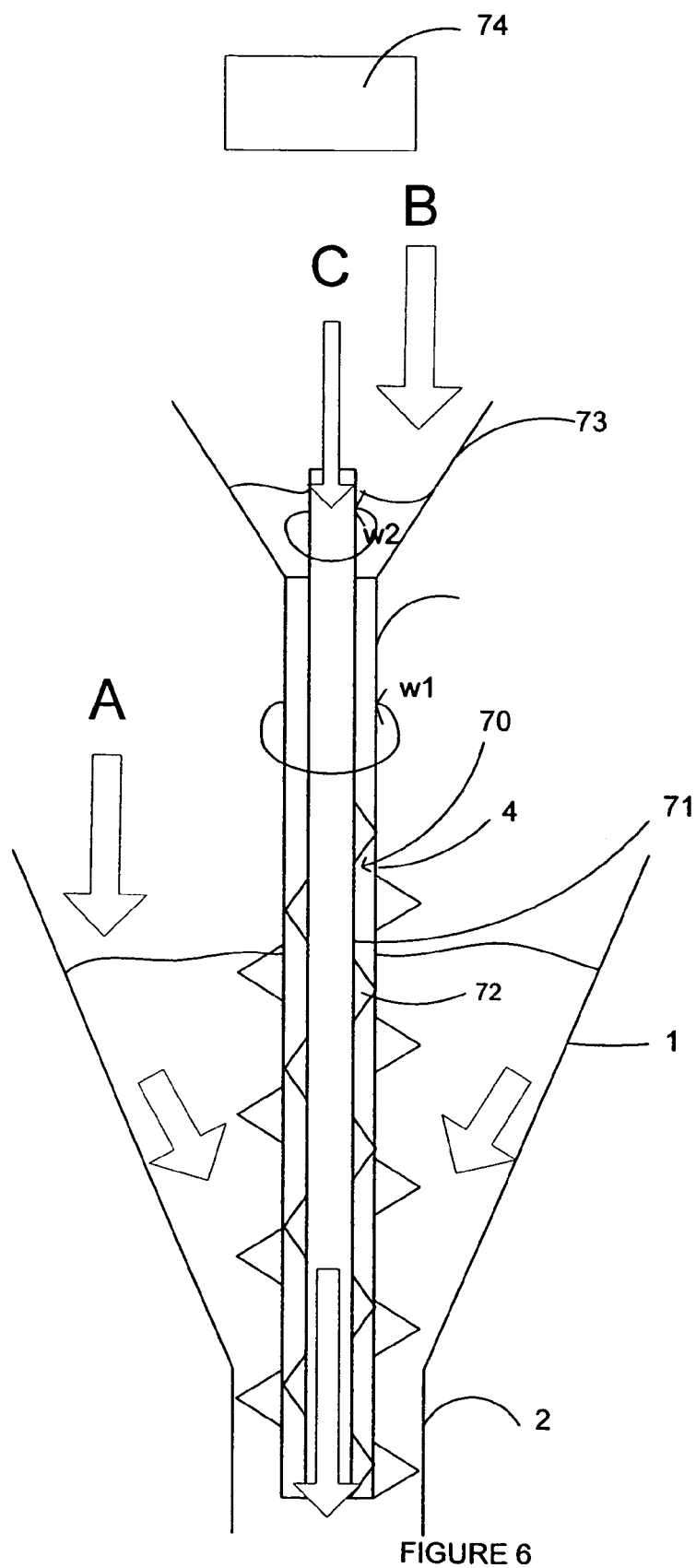
FIG. 6 shows a schematic drawing of a dispensing apparatus including first and second augers.

Referring now to FIG. 6 a dual auger embodiment is shown. A second auger 70 is provided within the hollow shaft 4 to feed a second component B to an outlet 2 at a desired rate. Although less preferred, the second auger 70 can include a hollow shaft 71. Additionally, the second auger 70 includes auger flights 72. The auger 70 can be rotated in the direction of arrow w2 by suitable motive means such as an electric motor, pneumatic motor, hydraulic motor etc. The first and second augers can rotate in the same or opposite directions.

A hopper 73 receives the second component B and supplies it to the hollow shaft 4. Preferably, a liner is provided within the hollow shaft 4 so that it can move independently of the hopper 73.

The first and second augers can be driven at constant speed to deliver a continuous stream of the first and second components A and B at a desired ratio. Alternatively, the augers 3 and 70 can be driven in a pulsed manner to provide predetermined quantities of the first and second components A and B at intervals to the outlet 2. Alternatively, one auger can be driven continuously and the other pulsed.

If desired, a third component C can be fed from a dispenser 74 to outlet 2 via the hollow shaft 71. It will be appreciated that any number of augers within augers can be provided limited only by the available physical dimensions. It will also be appreciated that any of the features of the previous embodiments can be incorporated in conjunction with the dispensing apparatus shown in FIG. 6.

The use of the dispensing apparatus shown in FIG. 3 will now be described in relation to the dispensing and bagging of various food products. In a first example a baking mix (e.g. a mix for cookies, brownies, cakes, muffins, pancakes, etc.) can be supplied to the hopper 1. A fragile particulate material (e.g. chocolate chips, nuts, coloured chips, fruit etc.) can be supplied by a measuring device 30 to the hollow shaft 4. The measuring device 30 can be a cup filler, combination scales or other similar device as described previously. The first auger 3 can be driven continuously and particulate component B can be supplied from the measuring device 30 either at a constant rate or in measured amounts at regular intervals. The resulting mixture can be continuously bagged at the outlet 2. Alternatively, the auger 3 can be driven in a pulsed fashion to deliver a predetermined amount of the first component A to the outlet 2 per cycle. For example, the auger 3 can be pulsed to rotate from 0 to 500 rpm and back to 0 rpm over a one second period. The second component B can be supplied in discrete measures from the measuring device 30 to coincide with the pulses of the first auger.

The apparatus of FIG. 5 can be employed when packaging a dry mix component (such as a brownie mix or macaroni) with a liquid component (such as chocolate syrup or liquid cheese). The liquid can be conveyed via the hollow shaft 4 to an outlet to be bagged in an internal second pouch 82 (see FIG. 8) and the particulate component can be delivered via the outlet 2 to an outer first pouch 81 so as to form a pouch in a pouch package as shown in FIG. 8.

The arrangement of FIG. 6 can be employed to deliver a desired ratio of particulate first and second components A and B at outlet 2. The hollow shaft 71 can be used to supply a third component C or to supply or remove gas from outlet 2. An inert gas can be supplied from dispenser 74 via the hollow shaft 71 so that a package formed at outlet 2 contains an inert gas to reduce degradation of the food product. Alternatively, air can be removed from a package formed at the outlet 2 by a dispenser 74 applying a vacuum and removing air via the hollow shaft 71. This can reduce the volume of the packaged product and the rate of degradation of the food products contained therein.

Figure 9:
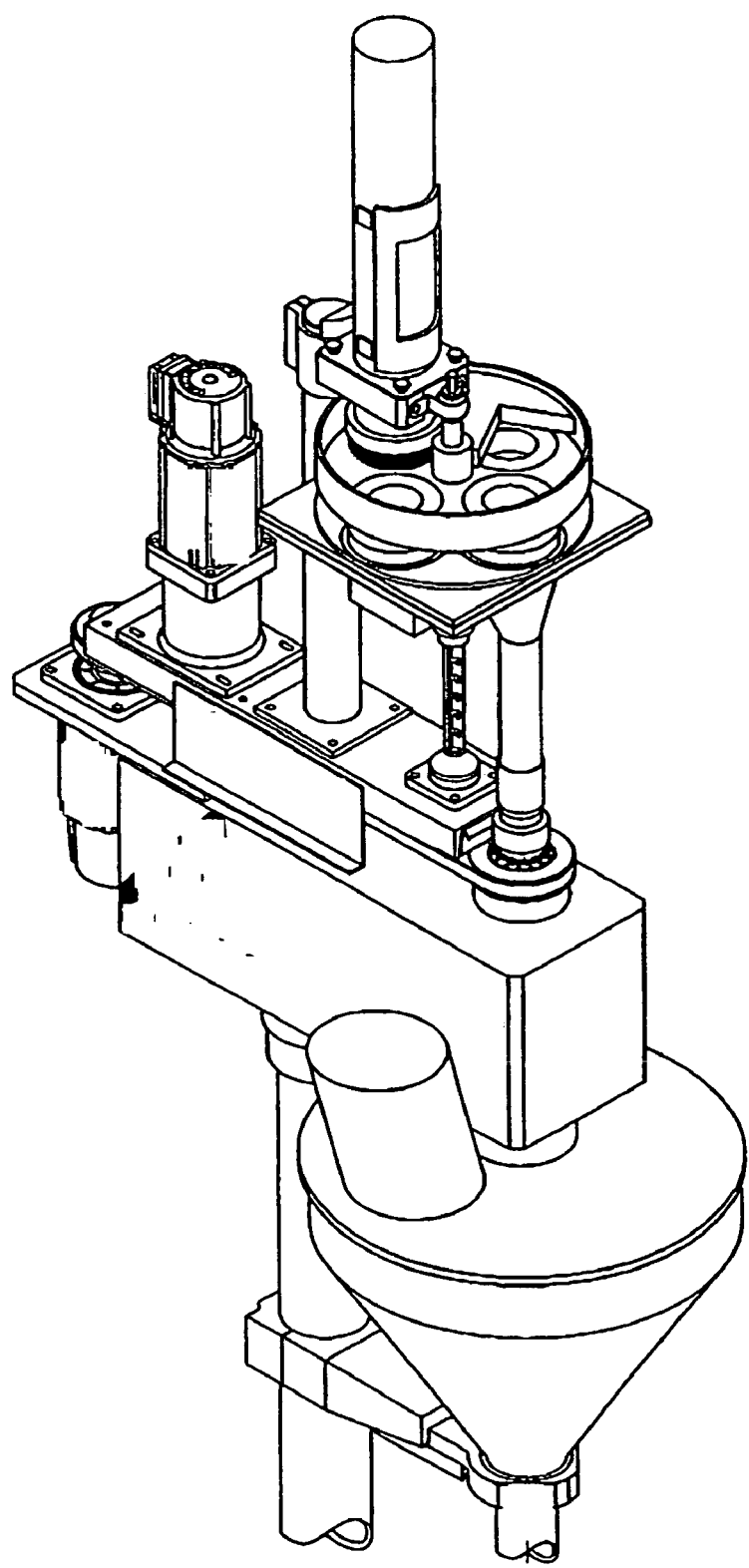
FIG. 9 shows a perspective view of a dispensing apparatus suitable for implementing the method of the invention.
Figure 10:
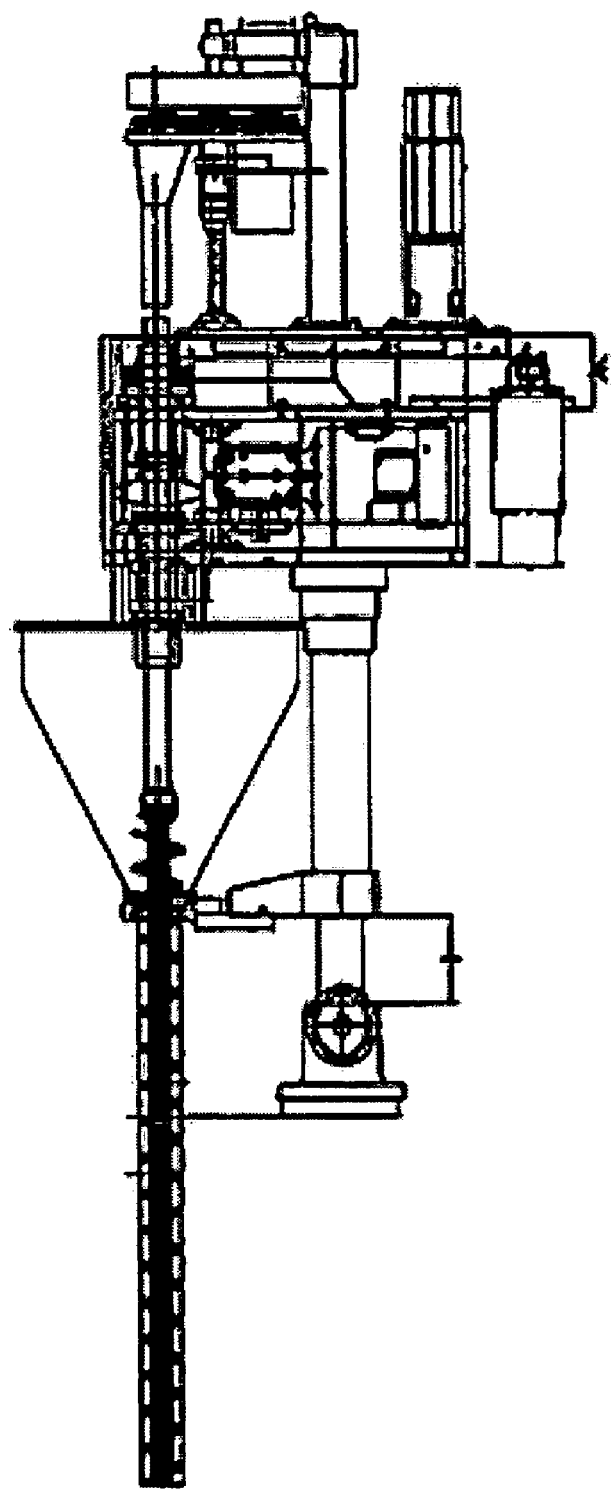
FIG. 10 shows a cross sectional side view of the dispensing apparatus shown in FIG. 9.

Referring now to FIGS. 9 and 10 a dispensing apparatus suitable for performing the method of the invention is shown. A dispensing apparatus 100 includes a hopper 101 that receives a first component via an inlet 102. An auger 103 extends from the hopper 102 through an outlet tube 104. A hollow shaft 105 has auger flights 106 provided along the lower section thereof. A motor 118 rotates the hollow shaft 105 via the arrangement of pulleys 107 and 108 and a drive belt 109. The motor 118, pulleys 107 and 108, and the drive belt 109 form a first drive. Where the auger is to be driven in a pulsed manner a servo motor can be used.

A cup filler 110 supplies a second component to a funnel 111 that supplies the second component to the hollow shaft 105. The second component is supplied to the cup filler 110 via the tube 112. The second component is deposited in a cup 113 located in a tray 114. The tray 114 is rotated via the motor 115 via a belt drive arrangement. The tray 114 can be rotated a quarter revolution or multiples thereof each packaging cycle. As the cup is rotated a blade 116 levels the contents of the cup to the desired level. When a cup 113 is positioned over the funnel 111 the contents of the cup pass through an aperture into the funnel 111 and are delivered via the hollow shaft 105 to the outlet of the dispensing apparatus. For a pulsed mode of operation the tray 114 can be rotated by the motor 115 once per cycle and the auger 103 can be rotated for a period by the motor 118 once per packaging cycle. A motor 119 rotates an agitator 117 via a suitable drive linkage. The motor 119 preferably runs at a low constant speed and can be a suitably geared AC or DC electric motor. The motors 115, 118 and 119 can be controlled by a programmable logic controller or other suitable control device.

The invention thus provides a dispensing apparatus that eliminates the need for premixing components and thus reduces equipment cost. The apparatus also allows rapid transitions between different product lines and easy cleaning of allergens from parts of the apparatus. The method and apparatus allow substantially uniform ratios of components to be provided for packaging, improving consistency and reducing cost. The apparatus provides means for mixing delicate particulate materials that minimizes damage to such particulate components. The method and apparatus also allow for the addition of an inert atmosphere or removal of air from packages during bagging.

Where in the foregoing description reference has been made to integers or components having known equivalents then such equivalents are herein incorporated as if individually set forth.

Although this invention has been described by way of example it is to be appreciated that improvements and/or modifications can be made thereto without departing from the scope or spirit of the present invention.

What is claimed is:

1. A dispensing apparatus, comprising:
   a hopper having an outlet at its lower end thereof;
   a first auger comprising a first hollow shaft having auger flights along at least part of the exterior of the shaft positioned within the hopper so as to feed at regular intervals at a first desired rate in use, a first component within the hopper to the outlet when rotated;
   a first drive means for rotating the first hollow shaft;
   a dispenser for supplying at a second desired rate a second component through the first hollow shaft to the outlet, wherein the first hollow shaft includes a hollow liner for conveying the second component there through, and;
   a packaging device at the outlet for packaging the first and second components in a package, wherein the packaging device comprises a mechanism for forming a flexible film pouch around the outlet and sealing mechanism for sealing the pouch closed after a desired amount of the first and second components has been delivered to the pouch.

2. The dispensing apparatus as claimed in claim 1 wherein the liner is a rigid tube.

3. The dispensing apparatus as claimed in claim 2 wherein the liner is formed of metal or a rigid plastic.

4. The dispensing apparatus as claimed in claim 1 wherein the liner is a flexible tube.

5. The dispensing apparatus as claimed in claim 4 wherein the liner is formed of a flexible film.

6. The dispensing apparatus as claimed in claim 1 wherein the first hollow shaft includes a second auger disposed within the first hollow shaft and a second drive means for rotating the second auger for conveying the second component through the first hollow shaft.

7. A dispensing apparatus, comprising:
   a hopper having an outlet at its lower end thereof;
   a first auger comprising a first hollow shaft having auger flights along at least part of the exterior of the shaft positioned within the hopper so as to feed at regular intervals at a first desired rate in use, a first component within the hopper to the outlet when rotated;
   a first drive means for rotating the first hollow shaft;
   a dispenser for supplying at a second desired rate a second component through the first hollow shaft to the outlet;
   second auger disposed within the first hollow shaft and a second drive means for rotating the second auger for conveying the second component through the first hollow shaft wherein the second auger includes a second hollow shaft for conveying a third component therethrough, and;
   a packaging device at the outlet for packaging the first, second and third components in a package, wherein the packaging device comprises a mechanism for forming a flexible film pouch around the outlet and sealing mechanism for sealing the pouch closed after a desired amount of the first, second, and third components has been delivered to the pouch.

8. The dispensing apparatus as claimed in claim 7 wherein the second hollow shaft includes a third auger disposed within the second auger and a third drive means for rotating the third auger for conveying the third component through the second hollow shaft.

9. A method of dispensing a first component and a second component comprising the steps of:
   supplying the first component to a hopper having an outlet at its lower end and operatively connected to a first auger comprising a first hollow shaft having exterior auger flights extending from the outlet end to the interior of the hopper;
   rotating at regular intervals the first hollow shaft to feed the first component from the hopper to the outlet at a first desired rate; and
   supplying the second component or liquid via a liner within the first hollow shaft to the outlet at a second desired rate; and
   supplying the first and second component to a packaging device at the outlet for packaging the first and second components in a package, wherein the packaging comprises forming a flexible film pouch around the outlet and sealing the pouch closed after a desired amount of the first and second components has been delivered to the pouch.

10. The method as claimed in claim 9 wherein the second component is fed via a second auger provided within the first hollow shaft.

11. The method as claimed in claim 9 wherein the second component is packaged within a first pouch formed within a second outer pouch.

* * * * *